Figure 1:
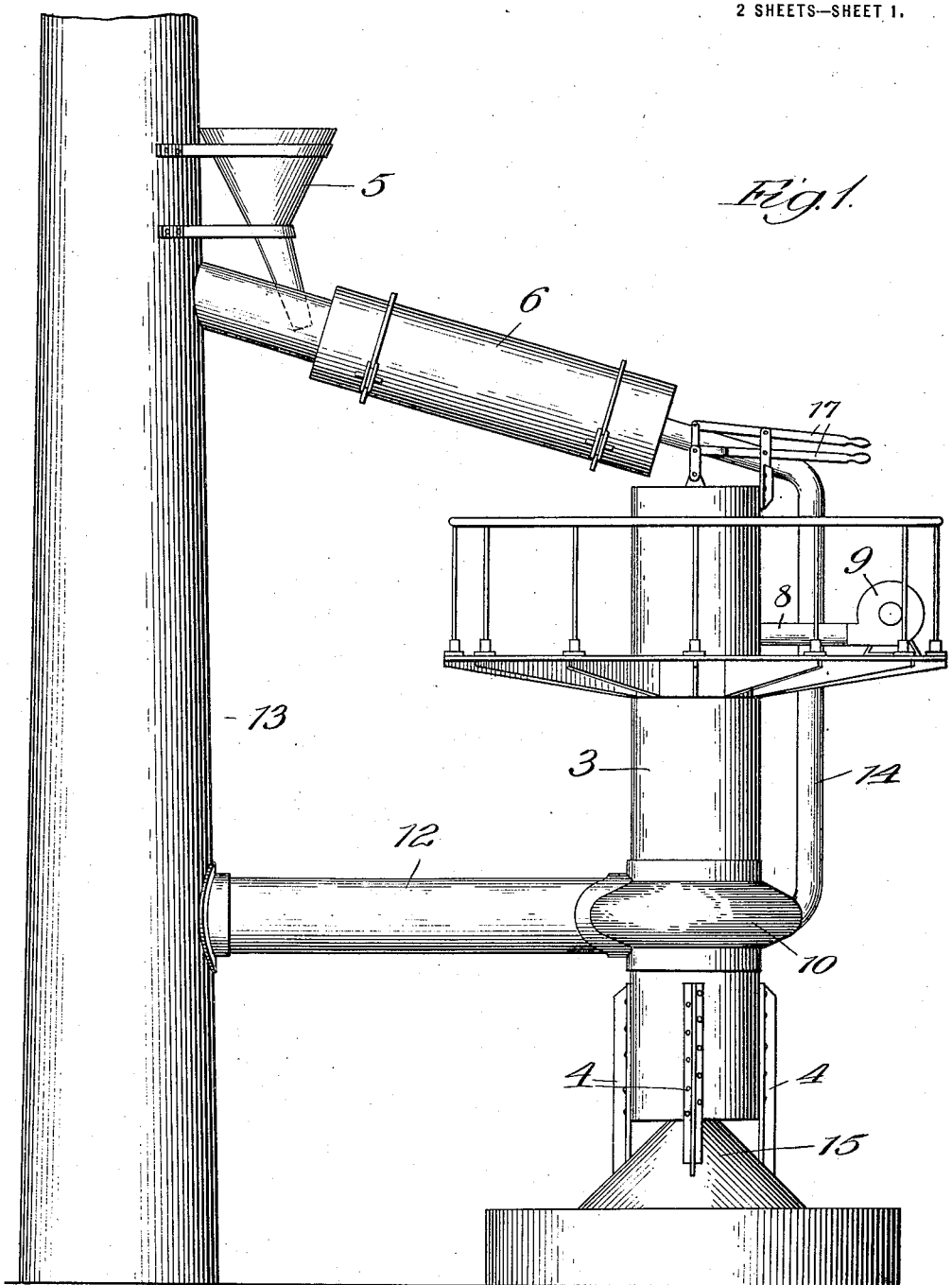

A. G. & J. T. JONES.
METHOD OF TREATING ORES.
APPLICATION FILED JULY 21, 1913.

1,174,727.

Patented Mar. 7, 1916.
2 SHEETS—SHEET 1.

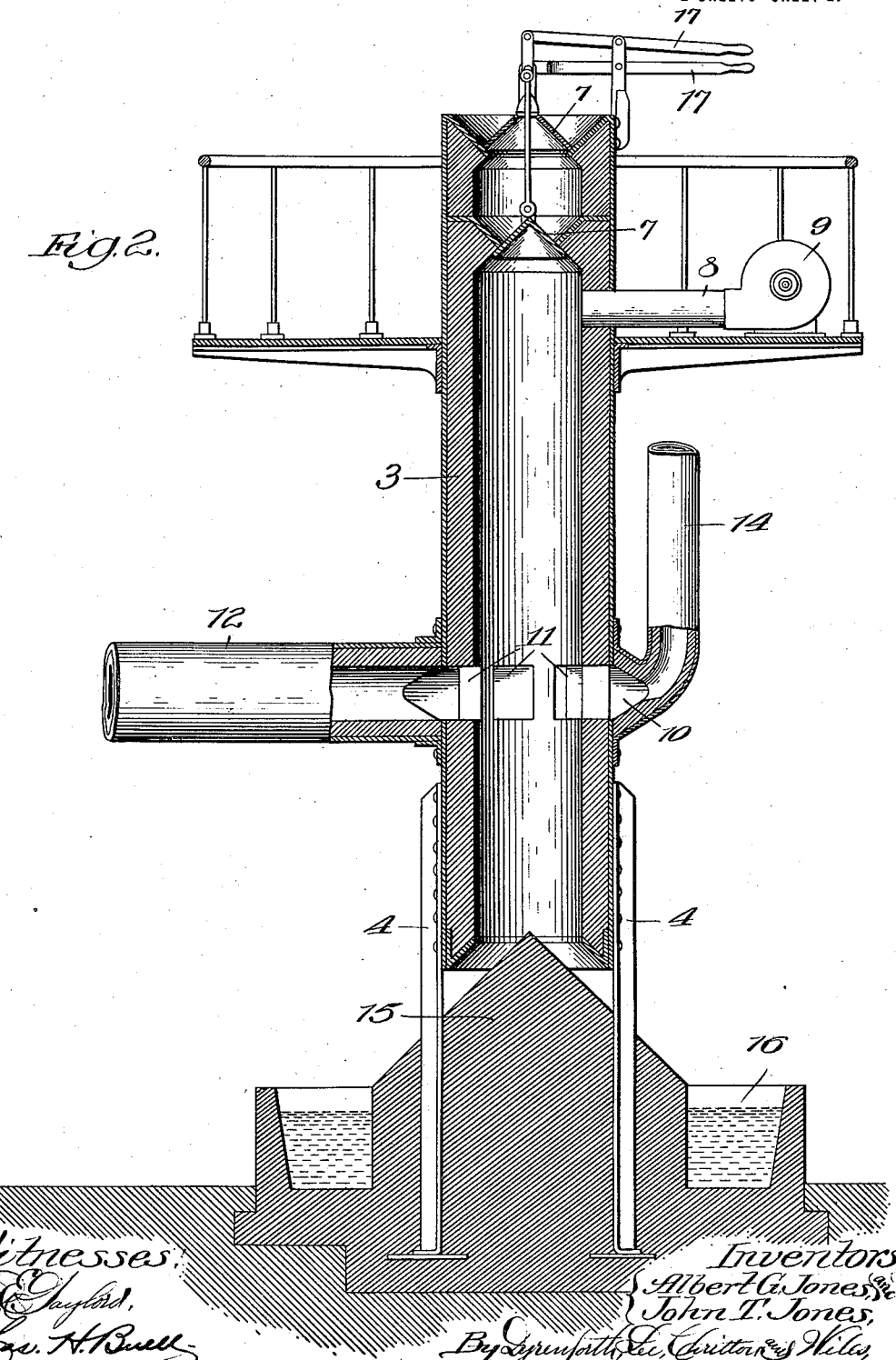

UNITED STATES PATENT OFFICE.

ALBERT G. JONES AND JOHN T. JONES, OF IRON MOUNTAIN, MICHIGAN, ASSIGNORS TO NEW METALS-PROCESS COMPANY, OF CHICAGO, ILLINOIS, A CORPORATION OF ILLINOIS.

METHOD OF TREATING ORES.

1,174,727.   Specification of Letters Patent.   Patented Mar. 7, 1916.

Application filed July 21, 1913. Serial No. 780,229.

*To all whom it may concern:*

Be it known that we, ALBERT G. JONES and JOHN T. JONES, citizens of the United States, residing at Iron Mountain, in the county of Dickinson and State of Michigan, have invented a new and useful Method of Treating Ores, of which the following is a specification.

This invention relates to an improved process of treating ores for the purpose of extricating therefrom the metal values, and the method may be advantageously employed in the treatment of ores containing metal values either in the form of oxids, sulfids or carbonates.

In practising our invention the ore to be treated is first crushed to a size as uniform as possible and is then mixed with hydrocarbon or carbonaceous fuel, which may be either wood, charcoal, coal or coke. Before charging the mixture into the furnace it is subjected to a preliminary heating and drying operation by hot gases escaping from the furnace. The amount of fuel mixed with the ore is preferably greatly in excess of what is required and in the case of wood, we find it desirable to provide the same in blocks less than one foot in dimension and fully twenty times more in bulk than the ore. The dry and heated ore and fuel mixture is charged into the top of a furnace, where it is ignited and subjected to an airblast, to raise the mixture to a temperature which causes the metal content of the ore to nodulize. In the treatment of oxid of iron, or other oxid ore, care is taken to so regulate the blast as to provide a hot atmosphere of a reducing nature, preferably in the form of a carbon mon-oxid and hydrogen gas, which in its action upon the ore, changes the metal oxids into metal and causes it to flow together into nodules, without melting the silicious ingredients of the ore. When the nodulizing of the metal is sufficiently complete the furnace contents are discharged into a bath of water, which cools the ore and extinguishes any unconsumed fuel. The latter being light, will float for the most part and may be raked out, dried and charged again into the furnace, while the ore will sink into the water and thus be freed from carbonaceous material. The ore with its nodulized metal contents is then ground to free the nodules from the gangue and is then subjected to a dressing operation to separate the metal from the slag-making constituents of the ore.

In the accompanying drawings we show a furnace adapted for the practice of our invention.

Figure 1 is a view in side elevation of our furnace and the means for pre-heating and drying the mixture; and Fig. 2 a vertical section of the furnace.

The reference numeral 3 designates an upright furnace chamber mounted at its lower end upon suitable pillars 4. At the top of the furnace is a charging hopper 5, a rotary drum 6 and suitable charging bells 7 of well known construction. Entering the furnace near its upper end, below the charging bells is an air supply pipe 8 extending from a fan-blower or air-blast engine 9. Surrounding the furnace near its lower end is a bustle-pipe 10 communicating with the interior of the furnace through openings 11 and communicating through pipe 12 with a stack 13. Extending from the bustle-pipe 10 to the lower open end of the tube or drum 6 is a pipe 14. Below the lower end of the furnace is a conical base 15 surrounded by a water receptacle 16. In practice the ore is crushed to a size which permits all to pass through a screen of one inch mesh. The ore and fuel in desired proportions are deposited in the hopper 5 and flow into the upper end of the revolving tube or drum 6. When the furnace is in operation hot gases from the bustle-pipe 10 will pass upward through the pipe 14 and through the drum or tube 6 to the stack 13. In passing through the drum or tube 6 the mixture is dried and heated to a high temperature and is discharged into the top of the furnace. The feed of mixture to the furnace is regulated by the bells 7, which are operated by the levers 17 in the usual way. In the start the furnace is charged with the ore and fuel mixture and ignited at the top, where it is subjected to an air-blast from the pipe 8, which produces a downward draft to the bustle-pipe 10. Here the hot products of composition are withdrawn through the openings 11 and discharged through the pipe 12 into the stack 13 and through the pipe 14 into the tube or drum 6 for the purpose stated. As combustion of the fuel progresses downward, the ore is heated to a temperature sufficiently high to cause its metallic contents to run together and nodulize. In the treatment of metal oxid ores the air conveyed through the twyer or pipe 8 is kept at a pressure sufficiently low to prevent the ingress of an excess of oxygen, and thus result in the production of a reducing atmosphere, which robs the ore of its oxygen, and thus changes the metal oxids to metal, which run together and nodulize in the ore. Care must be employed to prevent the temperature in the furnace from rising to the melting point of the slag-making constituents of the ore. The effect of this treatment upon oxid ores is to reduce and nodulize the metal contents without the production of slag. And in the case of carbonates substantially the same effect is produced. In the case of sulfid ores nodulizing of the metal contents of the ore takes place without any material chemical change in the ore.

In practice, as the fuel is consumed the charge in the furnace descends and is deflected by the conical base 15 into the surrounding water bath in the receptacle 16. The nodulized ore sinks to the bottom of the receptacle while the unconsumed fuel and ash tend to float. This fuel may be gathered up, dried and fed again to the furnace. The nodulized ore is then removed from the receptacle 16 and subjected to a grinding operation to triturate the gangue and permit the nodulized metal to be separated therefrom, by jigging or otherwise, and saved.

The foregoing description is intended to convey a clear understanding of our invention in what we now believe to be the best form of its embodiment, and no undue limitation should be understood therefrom. It is our intention to claim all that is novel in our invention, and that the claims shall be construed as broadly as the prior state of the art may warrant.

What we claim as new and desire to secure by Letters Patent is—

1. In a nodulizing furnace, the combination of an upright furnace-chamber, means at the upper end of said chamber for feeding ore and fuel thereto, an air blast pipe communicating with the upper end of said chamber, a gas outlet near the lower end of said chamber, a discharge opening toward the lower end of the chamber, and a water bath to receive the material from said discharge opening.

2. In a nodulizing furnace, the combination of an upright furnace chamber, means at the upper end of said chamber for feeding a charge of fuel and ore thereto, means above the furnace for pre-heating and drying the charge, an air-blast pipe communicating with the upper end of said chamber, a gas outlet near the lower end of the chamber, a pipe communicating with said gas outlet and extending to said pre-heating means, and a discharge opening toward the lower end of the chamber.

ALBERT G. JONES.
JOHN T. JONES.

In presence of—
D. C. Thorsen,
A. J. Floyd.